Aug. 7, 1923.
J. YEGEN
1,463,916
PROCESS FOR REMOVING STUMPS
Filed Oct. 11, 1922
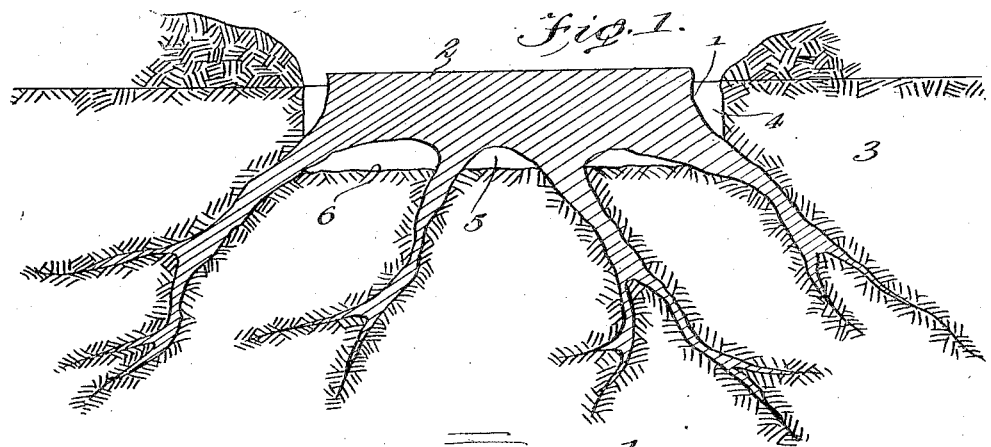
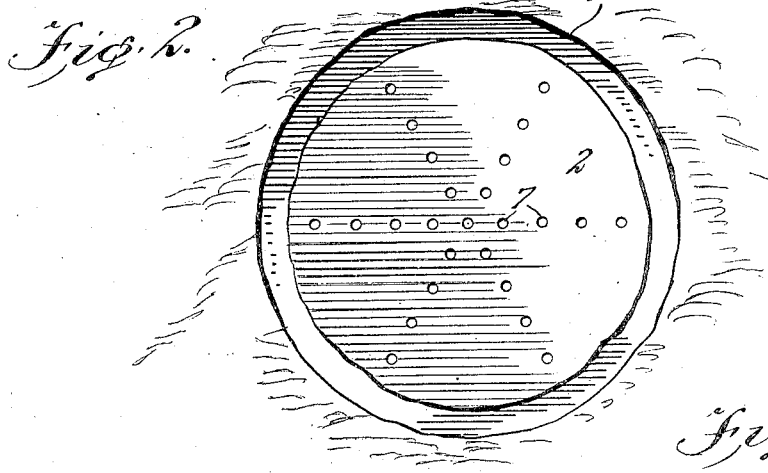
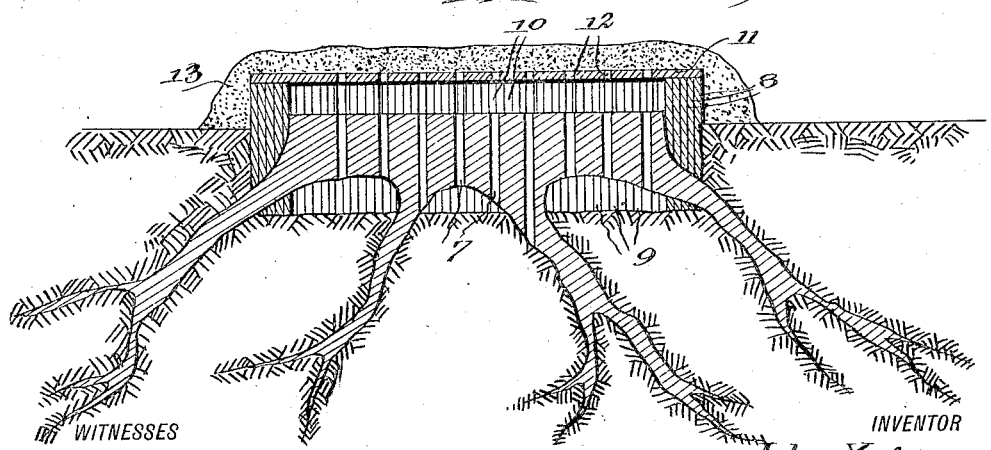
WITNESSES
INVENTOR
John Yegen,
BY
ATTORNEYS Patented Aug. 7, 1923.

1,463,916

UNITED STATES PATENT OFFICE.

JOHN YEGEN, OF BISMARCK, NORTH DAKOTA.

PROCESS FOR REMOVING STUMPS.

Application filed October 11, 1922. Serial No. 593,815.

*To all whom it may concern:*

Be it known that I, JOHN YEGEN, a citizen of the United States, and a resident of Bismarck, in the county of Burleigh and State of North Dakota, have invented certain new and useful Improvements in Processes for Removing Stumps, of which the following is a specification.

This invention relates to a process for removing stumps and has for its object the provision of a process whereby a stump is converted into charcoal.

A further object of the invention is the provision of a process for removing stumps by displacing the soil adjacent the stump to provide a fire box for the reception of fire wood. The stump is bored to provide vertical air passages extending from the top of the stump to the space between the bottom of the stump and the soil. Incomplete combustion of the stump and wood is had by lighting the wood and covering the stump and wood with soil whereby the stump is converted into charcoal.

Other objects and advantages of the invention will become apparent during the course of the following description.

The invention is illustrated by way of example in the accompanying drawings, in which, Figure 1 is a transverse vertical section of the stump showing the soil removed to form a fire pit.

Figure 2 is a plan view of the stump disclosing the arrangement of the vertical passages.

Figure 3 is a transverse vertical section of the stump disclosing vertical passages and the fire wood arranged beneath and around the stump.

Referring to the drawings, 1 indicates a stump which is sawed off to form a flat top 2 about 6 inches from the normal level of the ground 3. The soil is removed from the outer wall of the stump as shown at 4. Soil also is removed as shown at 5 which is located below the bottom of the stump and adjacent the upper end of the roots whereby a space is provided between the side wall of the stump and the earth and between the bottom of the stump and the layer of soil 6 which forms the base of the newly constructed fire pit.

The usual central root of the stump may be shirred off in order to provide a greater space between the bottom 6 of the fire pit and the base of the stump.

As shown in Figures 2 and 3, a series of vertical passages 7 are bored through the top of the stump downwardly where the passages open into the space 5 between the bottom 6 of the fire pit and the bottom of the stump to provide air passages whereby the hot gases may pass from the lower portion of the pit upwardly through the stump for converting the stump into charcoal and in a manner which will be presently described.

The stump is now in condition to be packed with fire wood. As shown in Figure 3 pieces of fire wood 9 are packed beneath the stump and in the space 5 while other fire wood 10 is packed upon the top 2 and around the sides of the stump. The fire wood is then ignited in any suitable manner at at least 4 points around the stump in order that a sufficient partial combustion of the fire wood and stump will be had.

When the fire wood is burning properly boards 11 are placed upon the fire wood 10 and are provided with perforations 12 which are adapted to be alined with vertical passages 7 in the stump 1. The boards and fire wood then are covered by a coating of soil 13.

It will be necessary from time to time to properly guard the fire in order to prevent the fire from consuming the stump instead of converting it into charcoal.

The amount of fire wood placed about and beneath the stump is sufficient to convert the stump into charcoal. Due to the covering 13 the fire is not supplied with sufficient oxygen to support complete combustion and therefore the stump is converted into charcoal. The gases formed by the slow burning of the wood will escape through the vertical passages 7 and eventually through the cover 13 without creating any great amount of draft through said passages.

After the stump and wood have been converted into charcoal the layer of soil 13 may be removed when the charcoal may be readily removed.

What I claim is:

1. The process of removing stumps which consists in removing a sufficient amount of soil from about the stump to provide a fire pit between the outer wall of the stump and the earth, drilling vertical air passages through the stump to connect the space below the stump with the atmosphere, then converting the stump into charcoal by burning the stump with an incomplete combustion.

2. The process of removing stumps which consists in removing a sufficient amount of soil from about the stump to provide a fire pit around and beneath said stump, forming vertical air passages in the stump, filling the excavated space about the stump with fire wood, igniting the fire wood and then covering the fire wood and stump with soil.

3. The process of removing stumps which consists in removing a sufficient amount of soil from about the stump to provide a fire pit around and beneath said stump, forming vertical air passages in the stump, covering the top of the stump with fire wood, igniting the fire wood on all sides of the stump and then banking the fire with soil.

4. The process of removing stumps which consists in removing a sufficient amount of soil from about the stump to provide a fire pit around and beneath said stump, forming vertical air passages in the stump, covering the top of the stump with fire wood, igniting the fire wood on all sides of the stump, covering the top of the stump with perforated boards and then covering the boards, stump and fire wood with soil.

5. The process of removing stumps which consists in removing a sufficient amount of soil from about the stump to provide a fire pit around and beneath said stump, forming vertical air passages in the stump, covering the top of the stump with fire wood, igniting the fire wood on all sides of the stump, sawing off the stump about six inches from the level of the ground, boring vertical air passages directly through the stump, packing fire wood about the sides, beneath the stump and on the top of the stump, igniting the fire wood on all sides of the stump, and then banking the fire with soil.

JOHN YEGEN.